J. BEAN.
Fire-Engine.

No. 165,056.

Patented June 29, 1875.

WITNESSES
Chas. H. Ourand
C. L. Everit

INVENTOR
Jno. Bean
By Alexander Mason
Attorney

UNITED STATES PATENT OFFICE.

JOHN BEAN, OF HUDSON, MICHIGAN, ASSIGNOR OF THREE-FOURTHS HIS RIGHT TO AARON CHANDLER AND L. D. RALESBACK, OF DAVENPORT, IOWA, AND R. A. BEAN, OF HUDSON, MICHIGAN.

IMPROVEMENT IN FIRE-ENGINES.

Specification forming part of Letters Patent No. 165,056, dated June 29, 1875; application filed April 23, 1875.

*To all whom it may concern:*

Be it known that I, JOHN BEAN, of Hudson, in the county of Lenawee and in the State of Michigan, have invented certain new and useful Improvements in Fire-Engines; and do hereby declare that the following is a full, clear, and exact description thereof, reference being had to the accompanying drawings and to the letters of reference marked thereon, making a part of this specification.

The nature of my invention consists in the arrangement of a double lever operating two buckets in each cylinder, one bucket moving less distance than the other; also, in the construction and combination of parts, as will be hereinafter more fully set forth.

In order to enable others skilled in the art to which my invention appertains to make and use the same, I will now proceed to describe its construction and operation, referring to the annexed drawing, in which—

Figure 1:
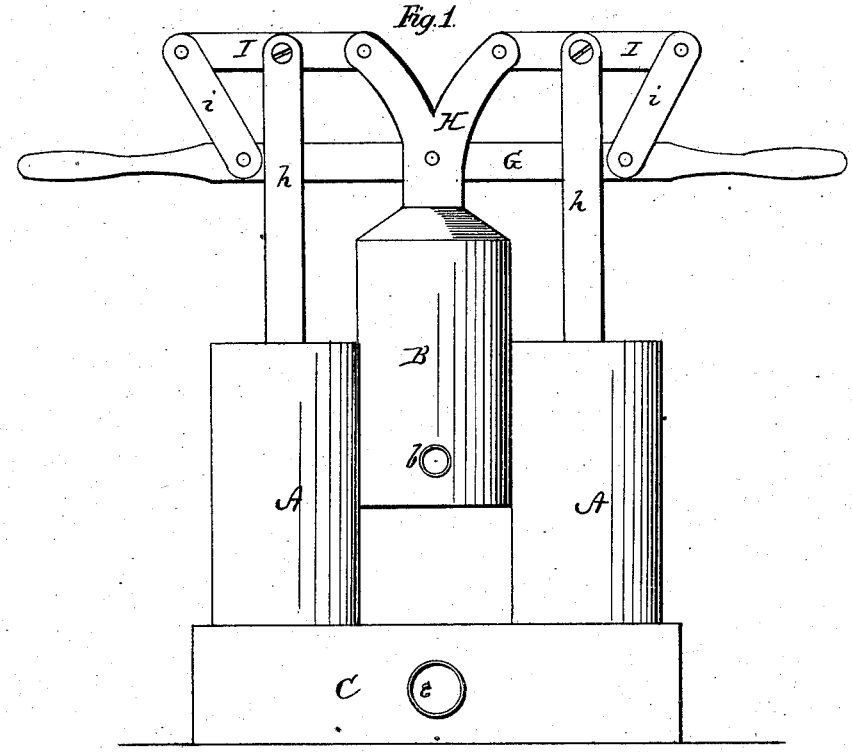
Figure 2:
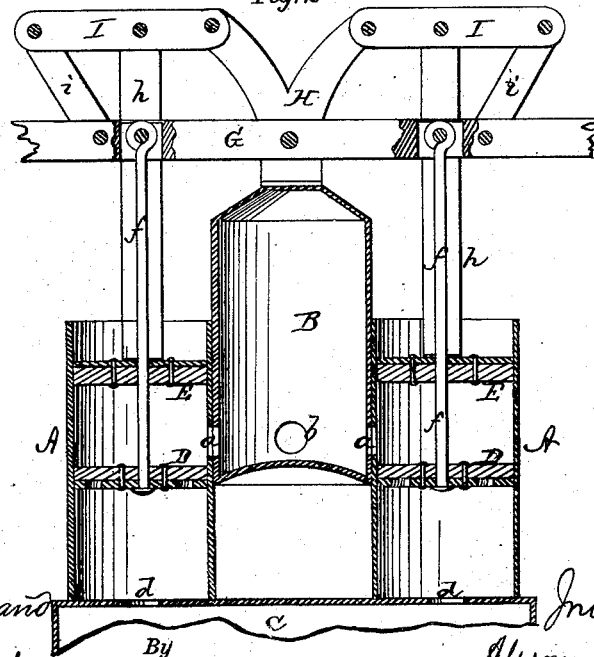

Figure 1 is a side elevation of a hand fire-engine embodying my invention, and Fig. 2 is a longitudinal vertical section of the same.

A A represent two cylinders, communicating, by passages $a$ $a$ at or near their centers, with the air-chamber B, placed between them, and having the outlet $b$ at its bottom. The cylinders A communicate with a chamber, C, underneath through openings $d$, the water being admitted into said chamber through the inlet $e$. In each cylinder A are two buckets, D and E, one of which moves with half the speed and double the power of the other. The lower bucket D, which feeds the cylinder, moves double the distance of the upper one E, which forces the water, and keeps the stream even. The lower bucket D is provided with a piston-rod, $f$, which passes up through the upper plunger E, and is pivoted to a lever, G. This lever is pivoted in the center between arms H H, attached to the top of the air-chamber B, and extending on both sides thereof, the two rods $ff$ being attached to the lever at equal distances from the pivot of the lever. Each upper bucket E is, by a rod, $h$, connected with a short lever, I, which is pivoted in the arm H above the lever G. The outer end of each lever I is, by a strap or rod, $i$, connected with the lever G a short distance beyond the point where the rod $f$ is connected thereto.

By this arrangement I have a double lever, one for each bucket, in order to get a straight draft over each bucket, and thereby giving double power on the upper bucket, whereas the lower bucket has all the power there is in the old engines with single lever applied.

Having thus fully described my invention, what I claim as new, and desire to secure by Letters Patent, is—

1. The arrangement of the double levers G and I I in combination with the buckets D and E and connecting-rods $f$ $h$ $i$, for the purposes herein set forth.

2. The combination of the cylinders A A and air-chamber B with their inlets and outlets, as described, the buckets D E in each cylinder, and the double levers G and I I, with connecting-rods $f$, $h$, and $i$, all substantially as and for the purposes herein set forth.

In testimony that I claim the foregoing I have hereunto set my hand this 15th day of April, 1875.

JOHN BEAN.

Witnesses:
G. I. THOMPSON,
C. L. EVERT.